Dec. 18, 1962 C. M. KRAMSKOY 3,069,658

MATRIX STORAGE DEVICES

Filed April 1, 1957 4 Sheets-Sheet 1

Inventor
C. M. Kramskoy
By [signature]
Attys.

Dec. 18, 1962 C. M. KRAMSKOY 3,069,658

MATRIX STORAGE DEVICES

Filed April 1, 1957 4 Sheets-Sheet 2

Inventor
C. M. Kramskoy
By Mascock Downing & Seebold
Attys.

Dec. 18, 1962 C. M. KRAMSKOY 3,069,658

MATRIX STORAGE DEVICES

Filed April 1, 1957 4 Sheets-Sheet 3

Inventor
C. M. Kramskoy
By Glascock Downing & Seebold
Attys.

Dec. 18, 1962 C. M. KRAMSKOY 3,069,658

MATRIX STORAGE DEVICES

Filed April 1, 1957 4 Sheets-Sheet 4

Inventor
C. M. Kramskoy
By Mascock Downing & Seebold
Attys.

3,069,658

MATRIX STORAGE DEVICES

Charles Mark Kramskoy, Ealing, London, England, assignor to Electric & Musical Industries Limited, Middlesex, England, a company of Great Britain Filed Apr. 1, 1957, Ser. No. 649,776
Claims priority, application Great Britain Apr. 4, 1956
10 Claims. (Cl. 340—172.5)

Figures 1, 2:
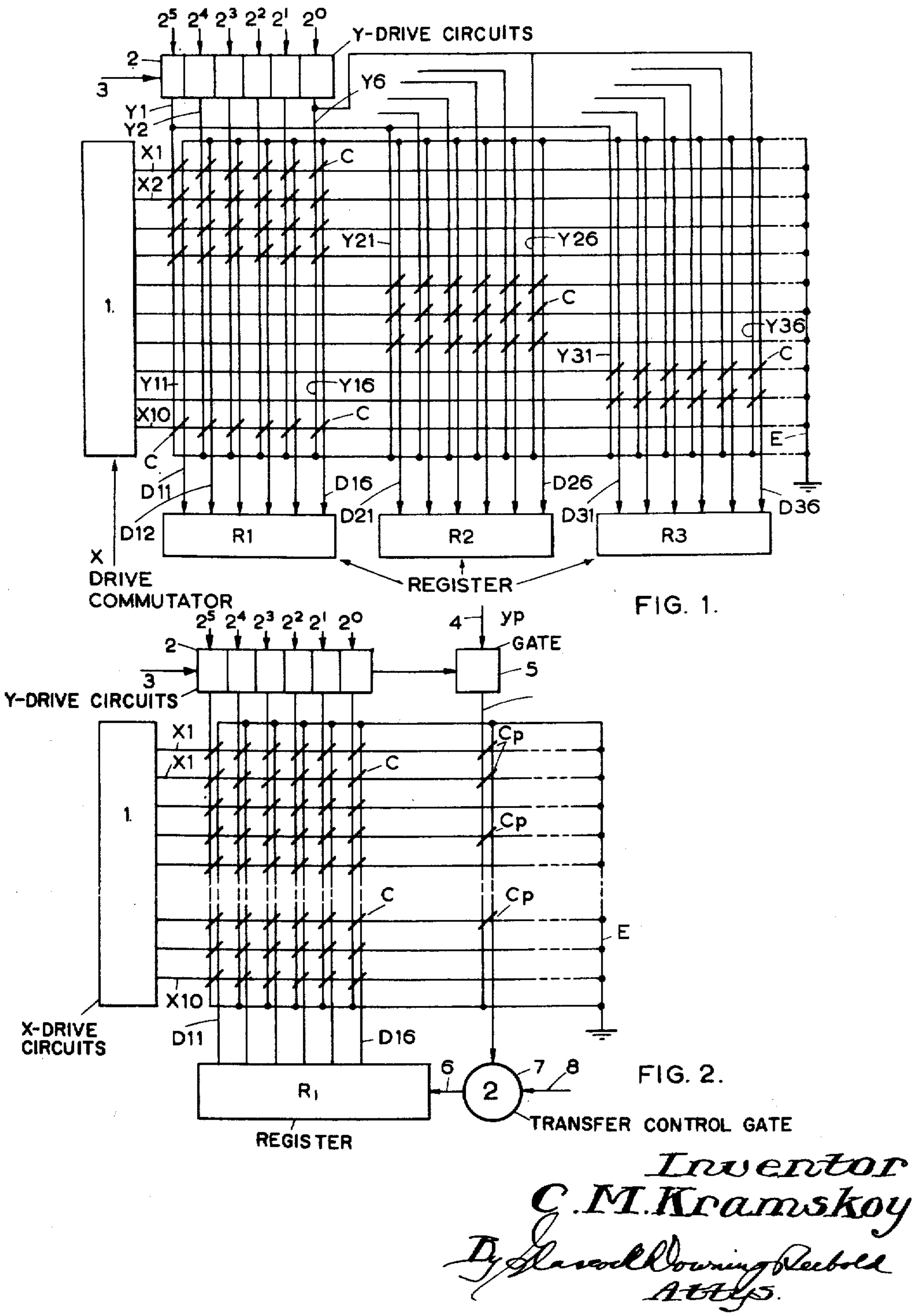

This invention relates to matrix storage devices, especially for data handling apparatus.

In data handling apparatus for commercial purposes, and other computing apparatus, it has been proposed to employ stores for data in binary digital code form and comprising magnetic cores. In one form of such store the cores may be arranged in rows and columns, each core being in the form of a relatively small washer. The rows and columns of cores form a matrix and the transfer of digital code signals to and from the store is controlled by so-called X and Y control circuits, each X circuit being coupled to all cores in a particular row and each Y circuit being coupled to all cores in a particular column. Further, read-out circuits are usually provided, each coupled to all cores in a particular column.

In a large data handling apparatus the performance of certain operations can often be simplified by the use of so-called "sub-routines." For example, many operations which the machine may be required to perform may involve, inter alia, a common series of steps and in a case such as this it is possible to simplify considerably the instruction programme for the machine by arranging that the machine can perform such a series of steps, that is a sub-routine, without individual instruction for each step. Simplification of the instruction programme is, moreover, an important consideration since programme preparation may involve the largest amount of human intervention necessary in the operation of the apparatus.

The object of the present invention is to facilitate the employment of subroutines in data handling apparatus.

According to the present invention there is provided a storage device suitable for electrical data handling apparatus comprising a matrix of magnetic cores including magnetic cores arranged in rows and columns, column control circuits one for each column of said cores and coupled with each core in the respective column, row control circuits one for each row of said cores and coupled with each core in the respective row, means for successively applying groups of binary code signal elements to said column control circuits, the binary code signal elements of each group being applied individually to the column control circuits, means for applying read in signals to said row control circuits in synchronism with said groups of binary code signal elements, to cause different rows of cores to assume a combination of magnetic states representative of the respective groups of binary code signal elements, means for applying read-out signals individually to said row control circuits to tend to change the cores of the respective rows each to a predetermined magnetic state, a plurality of destinations for binary code signals, and read-out circuit means responsive to changes of the rows of cores to said predetermined magnetic state for selectively applying binary code signals to said destinations, said read-out circuit means including circuits coupled to selected cores of said matrix to cause destination selection to depend on the row control circuit to which read-out signals are applied.

It will be obvious that the destination selection may be arranged to correspond to desired subroutines so that the invention in effect makes provision for sub-routines to be determined by the store itself. In other words, the sub-routines are built-in to the store.

Figure 3:
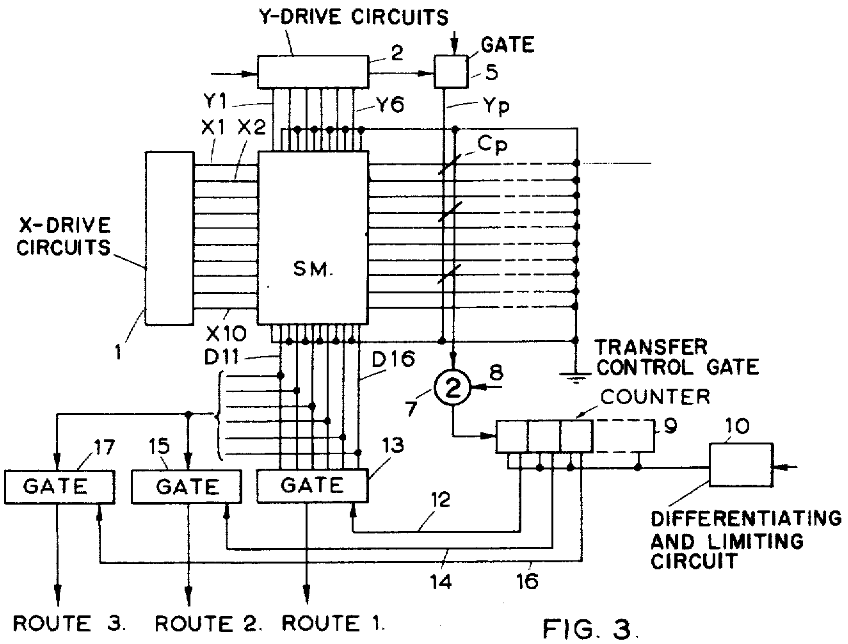
Figure 4:
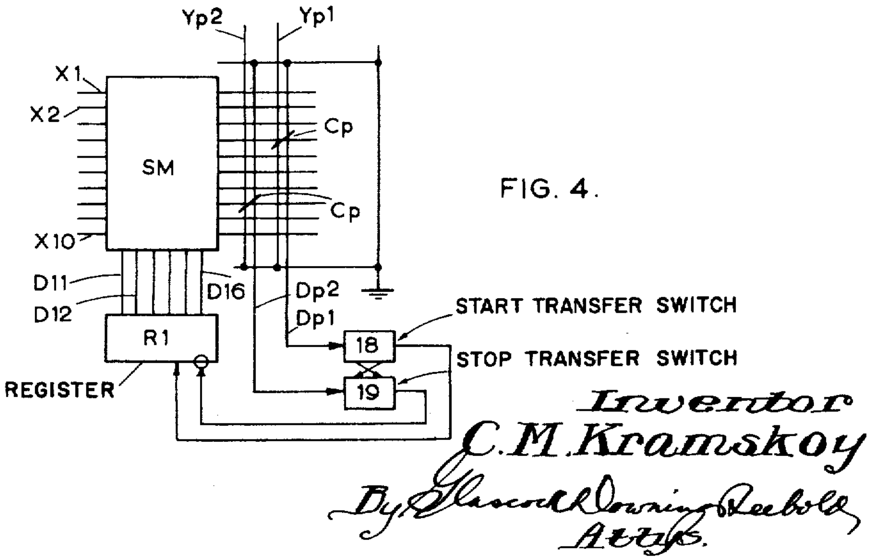
Figure 5:
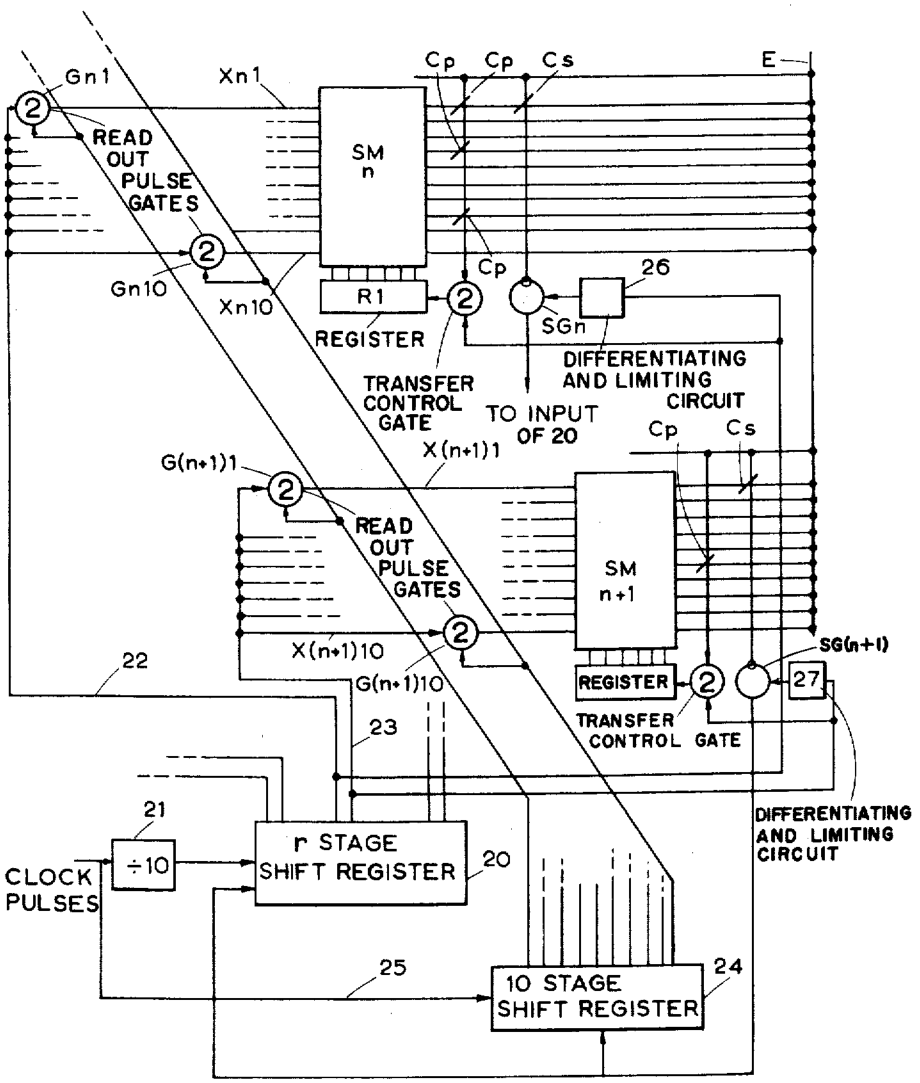
Figure 6:
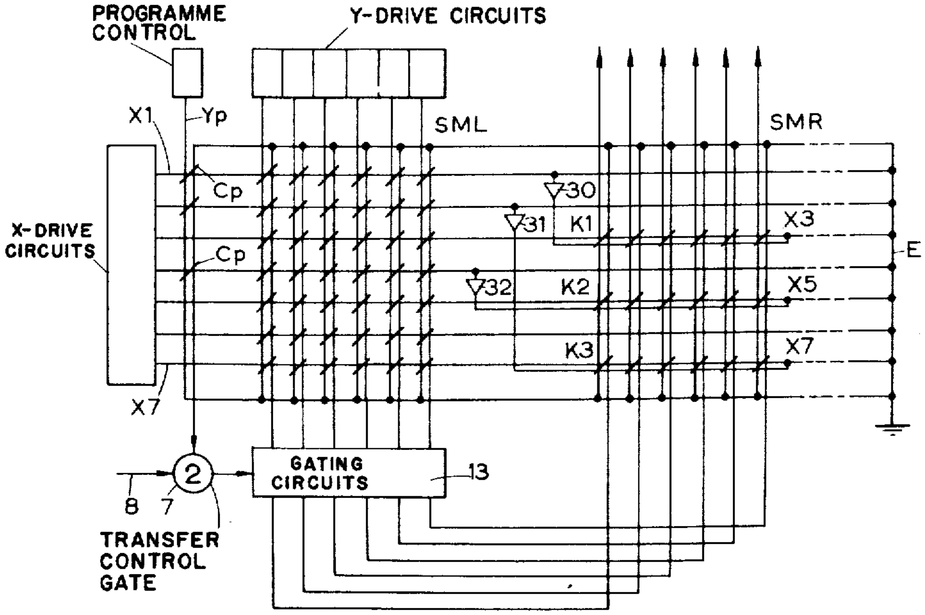

In order that the invention may be clearly understood and readily carried into effect, the invention will be described with reference to the accompanying drawings, in which:

FIGURE 1 illustrates one example of the invention which gives what is termed X classification, FIGURES 2 to 4 illustrate examples of the invention giving Y-programme control, FIGURE 5 illustrates an example of the invention giving Y programme control combined with what is termed skip control, and FIGURE 6 illustrates an example of the invention which allows character re-arrangement to be produced.

The stores illustrated in the drawings are intended for storing data coded in a binary code. Each character of the data, which may represent one decimal digit, or an alphabetic letter, is allotted to six binary digital places. In the stores, each character is allotted a row of six magnetic cores, the number of rows corresponding to the maximum number of characters which it is required to store. In the drawings, only a limited number of rows are shown for simplicity of illustration. In known manner a binary "1" digit is represented in a core by remanence magnetism of one polarity and a binary "0" digit is represented by remanence magnetism of opposite polarity. In all the figures of the drawings, the cores are represented by short diagonal lines and a few of them are denoted by the reference C. It will be observed that each of the stores shown in the drawing consists of one or more blocks or sub-matrices, and the cores in each block are arranged in 6 columns. Each column represents a binary digital place. Each row of cores in a matrix therefore represents a character of six binary digits. In all the figures of the drawings, corresponding parts are denoted by the same reference numerals.

Referring specifically to FIGURE 1, the arrangement illustrated therein is intended for the automatic selection of incoming binary characters, and it is assumed that the significance of the different incoming characters is predetermined, for example by the previous operation of the machine in which the store is used. For this purpose the rows of cores constituting the sub-matrix shown are divided into three difference groups, the first group comprising the first to the fourth rows and the last row, the second group comprising the fifth to the seventh rows, and the third group comprising the eighth and ninth rows. The sub-matrix shown has therefore six columns and ten rows although in practice the number would probably be much larger. The different groups of the core are displaced from each other in the drawing, to facilitate illustration, but in practice they need not be so displaced. The cores have X and Y control circuits, the X control circuits being represented by horizontal lines and the Y control circuits being represented by vertical lines. The X control circuits are denoted by the references X1, X2 . . . X10 and the Y control circuits are denoted by the reference Y1, Y2 . . . Y6. The X control circuits each comprise a conductor which in passing from X-drive means 1 to an earth bus-bar E is laced in predetermined sense through all the cores in the corresponding row. Similarly each Y control circuit passes from Y-drive means 2 to the earth bus-bar E, but each Y control circuit is shown as comprising a set of conductors for each group of cores in the sub-matrix. Thus the Y control circuit Y1 comprises three conductors Y11, Y21 and Y31 which are virtually in parallel, the conductor Y11 being laced through the cores in the first column of the first group in the sub-matrix. Correspondingly the conductor Y21 is laced through the cores of the first column of the second group of the sub-matrix and the conductor Y31 is laced through the cores of the first column of the third group of the sub-matrix. All the other Y control circuits are correspondingly arranged. In a practical case it may however be simpler to lace all the cores in one set of Y control circuits, especially if the different groups of cores are, as aforesaid, not displaced. The X drive means 1 may comprise a pulse commutator which in response to clock pulses from a machine clock, for example, is capable of applying pulses cyclically of the X control circuits X1 to X10, which pulses may have selectively one or other of two different amplitudes, one of which is double the other. Each pulse of greater amplitude is moreover such that it can change a magnetic core C from the state of remanence magnetism representing "1" to the state of remanence magnetism representing "0." On the other hand each pulse of lesser amplitude is of opposite polarity and tends to change a core from state "0" to state "1" but is of insufficient amplitude to do so unless augmented simultaneously by a suitable pulse on a Y control circuit. A pulse of the lesser amplitude is referred to as a read-in pulse and a pulse of the greater amplitude is referred to as a read-out pulse. The Y drive means 2 may be in the form of a buffer store or may consist merely of a series of gates. In operation of the apparatus, pulses representing the six binary code elements of a character to be entered can be applied simultaneously by the Y drive means 2 to the respective Y control circuits Y1 to Y6, in response to a control pulse on a lead 3 and a corresponding magnetic representation is set up in the cores C of any row which at the same time is sensitised by read-in pulses on the respective X control circuit. The operation of such X and Y drive means are well known to those skilled in the art and will not be further described. Moreover, in order to simplify the drawing they have been shown therein merely in block form.

Each group of cores in the sub-matrix shown has a series of six read-out circuits, one for each column of cores and they pass respectively from the earth bus-bar E to three registers R1, R2 and R3, there being one register for each group of cores. The read-out circuits leading to the register R1 are denoted by the references D11, D12 . . . D16 and similar references with appropriately changed suffixes are used for the read-out circuits leading to the registers R2 and R3. The registers are shown merely in block form since they may be of any suitable construction such, for example, as a magnetic drum store, a magnetic tape store or another magnetic core store.

In the drawings the X control circuits are shown broken near their right-hand end to represent that they may be common to other sub-matrices and in fact a single store may comprise a large number of sub-matrices.

In operation of the arrangement shown in FIGURE 1, it will be evident that successive characters read into the sub-matrix by successive energisation of the Y control circuits Y1 to Y6 and sequential energisation of the X control circuits X1 to X10 are automatically sorted into groups corresponding to the registers to which the characters are subsequently to be assigned. Thus, when read-out pulses are applied in sequence to the X control circuits X1 to X10, the first four and the last of the stored characters are transferred to register R1, the fifth to the seventh characters are transferred to the register R2 and the eighth and ninth characters are transferred to the register R3.

The arrangement shown in FIGURE 1 may be said to provide X classification of received characters. The arrangement shown in FIGURE 2 produces similar selection by what may be termed Y programme control. This is achieved by providing an extra Y control circuit Y*p* to which can be applied, if desired, a pulse *yp* from lead 4, by way of a gate 5 or buffer store, when a character is applied to the Y drive means 2. The gate or store 5 is operated by the same control pulse as the Y drive means 2. The control circuit Y*p* corresponds to another column on the sub-matrix shown but this column has cores only in selected rows, and such cores are denoted by the references C*p*. It will be appreciated that on reading characters into the store each of the cores in the extra column will be set in the "1" state if a *yp* pulse accompanies the corresponding characters. In FIGURE 2 only one register R1 is shown, for simplicity, and this is arranged normally to be insensitive to information occurring in the read-out circuits D11 to D16. However it can be rendered sensitive when a pulse is applied to it on the lead 6 from a transfer control gate 7 which has a threshold of two. One input to the gate 7 comprises pulses applied by the lead 8 and timed in synchronism with the read-out pulses on the X control circuits X1 to X10. Alternatively a single pulse having a duration enclosing a full sequence of the read-out pulses may be employed as the input applied to the gate 7 via the lead 8. A long pulse of this character may be termed a block pulse. A second input to the gate is applied by the Y*p* circuit. Consequently when read out pulses are applied sequentially to the circuits X1 to X10, the register R1 is conditioned to receive characters only from those rows which have a core coupled in the Y*p* circuits provided the respective core is in state "1", and the register remains insensitive to other characters.

The arrangement shown in FIGURE 2 is not restricted to the addition of a single Y*p* circuit and several are employed for selecting different characters for transmission to different registers, thereby producing a similar result to that obtained in FIGURE 1. Moreover transfers can be made conditional, on the presence or absence of *yp* pulses.

FIGURE 3 illustrates a development of FIGURE 2 in which one Y*p* circuit can be used to selected different channels for different characters. In this figure, the sub-matrix of cores (other than the control cores) is shown as a single block denoted by the reference SM. The output of the transfer control gate 7 is applied to a counter 9 which is reset to zero after each complete sequence of X driving pulses. This resetting of the counter can be achieved by applying block pulses by way of a differentiating and limiting circuit 10 to a resetting connection in the counter. The circuit 10 produces a spike on the occurrence of each edge of a block "*n*" pulse and the limiting circuit is arranged to remove the spike that corresponds to the beginning of the pulse leaving only the spike corresponding to the end of the pulse. The counter 9 may be arranged to have a modulus equal to the number of X control circuits, namely 10 in the present example, since there may be 10 cores C*p* on the circuit Y*p*. In the example shown, the counter is only required to count to three, as there are only three cores C*p*. When the count registered is one, an energising signal is applied by a lead 12 to a gating circuit 13. This circuit may comprise six similar gates controlled jointly in such manner that if an energising signal is present in the lead 12, binary code elements read out by way of the circuits D11 to D16 can pass to a desired channel, denoted in the drawing as route 1. This channel will, of course, have six conductors corresponding to the six binary code elements but only one is shown for convenience of illustration. When the counter 9 registers two, an energising signal is applied by the lead 14 to a gating circuit 15 which is similar to 13 and connects the read out circuits D11 to D16 to a second route denoted as route 2. Similarly when a count of three is registered energising signals are applied by the lead 16 to a gating circuit 17 to connect the read out circuits D11 to D16 to a third route, designated route 3. It will be clear from the drawing that the counter will register 1 while first, second and third characters are being read out by means of read-out pulses on the X control circuits X1 to X3. Similarly, the counter registers two when the fourth to the seventh characters are being read out and the counter registers three whilst the eighth, ninth and tenth characters are being read out.

FIGURE 4 illustrates another modification of FIG-

URE 2 in which additional $Yp$ control circuits are used to make selective transfers from the sub-matrix SM. In this case two $Yp$ circuits are employed each having a core $Cp$ located in the fourth row and eighth row respectively. Corresponding read-out circuits $Dp1$ and $Dp2$ are connected to start and stop transfer switches 18 and 19 respectively. These switches are two state devices coupled to the register 1 so that when the switch 18 is in state "1" the register is sensitive to the characters applied to it by the read-out circuits D11 and D16. When however the switch 19 is in state "1," the register R1 is insensitive. As indicated in the drawing, the switches 18 and 19 are cross connected so that when switch 18 changes to state "1" the switch 19 is changed to state "0" and vice versa.

In a modification of FIGURE 4 the two cores which initiate and terminate the transfer to a register may be arranged on a single $Yp$ circuit, but the coupling of the corresponding output circuit is then arranged to be such that whereas one core provides an output of one polarity, the other core provides an output of the opposite polarity.

The example of the invention illustrated in FIGURE 5 is intended for use in a machine having a store comprising a large number of sub-matrices and where it may be required to select for transfer to particular destinations only the characters of selected rows of selected sub-matrices. The blocks denoted by the reference $Sm_n$ and $SM(n+1)$ represent two sub-matrices of the store the suffixes $n$ and $(n+1)$ being used to indicate that the sub-matrices may be any two sub-matrices in the store. Moreover, to simplify illustration, the read-in circuits for the sub-matrices have been omitted and only parts of the read-out circuits have been shown. During a read-out cycle, the sub-matrices are taken in turn, in an order controlled by a shift register 20 which has $r$ stages, assuming $r$ sub-matrices. Normally the register 20 is advanced in unit steps by pulses received from a dividing circuit 21, the input pulses for which are clock pulses and which has a division of ten. The X control circuits for the register $SM_n$ are denoted by the reference $Xn1$ to $Xn10$ and the X control circuit for the sub-matrix $SM(n+1)$ are denoted by the references $X(n+1)1$ to $X(n+1)10$. The X control circuits receive read-out pulses by way of gates $Gn1$ to $Gn10$ and gates $G(n+1)1$ to $G(n+1)10$, respectively, all these gates being of threshold 2. In the case of both sub-matrices only the first and the last of the respective gates are shown. The series of gates $Gn1$ to $Gn10$ receive one input consisting of block pulses from the $n$th stage of the shift register 20, by way of a conductor 22, and gates $G(n+1)1$ to $G(n+1)10$ similarly receives one input from the $(n+1)$th stage of the shift register 20 by way of a conductor 23. Moreover gates $Gn1$ to $Gn10$ individually receive second inputs from the ten stages of a ten stage shift register 24 which advances by unit steps in response to clock pulse applied by an input lead 25. The gates $G(n+1)1$ to $G(n+1)10$ also receives inputs individually from the stages of the register 24. By virtue of the arrangement described so far, it will be understood that if the shift registers 20 and 24 operate normally, the shift register 20 selects in turn the sub-matrices by sensitising the respective gates to allow the admission of read-out pulses, generated sequentially by operation of the shift register 24.

The sub-matrix $Smn$ is provided with three additional cores $Cp$ in the first, fourth and eight rows for selecting desired characters from the sub-matrix. It has, moreover, a further core in the first row which can be used for what will be termed "skip control." This core is denoted by the reference $Cs$. The sub-matrix $Sm(n+1)$ has a core $Cp$ on the sixth row and a skip control core $Cs$ on the first row. During the read in cycle, the cores $Cp$ and $Cs$ can be selectively changed to state "1" in response to $Yp$ pulse on appropriate read-in circuits. Assume that in response to a particular read-in cycle, the $Cp$ and $Cs$ cores of the sub-matrix $SMn$ are all in state "1" whereas those of the sub-matrix $SM(n+1)$ are in state "0." The read-out circuits for both the cores $Cs$ are coupled to inhibition terminals of two gates denoted by the reference SG, wtih appropriate suffixes. The normal input to the gate $SGn$ is applied from a differentiating and limiting circuit 26 which has its input connected to the output conductor 22 from stage $n$ of the register 20. Similarly the normal input of the gate $SG(n+1)$ is derived from differentiating and limiting circuit 27 which derived its input from the output conductor 23 of the $(n+1)$th stage of the register 20. The circuits 26 and 27 are arranged to produce a pulse corresponding to leading edge of the respective block pulses which occur on the conductors 22 and 23.

With the cores $Cs$ in the states envisaged in the preceding paragraph, the gate $SGn$ is inhibited since the core $Cs$ is in state "1." Therefore when the register 20 feeds a block pulse to the conductor 22 the circuit operates normally, pulses are applied in sequence to the X control circuits $Xn1$ to $Xn10$ and the control exercised by the cores C1 cause the first, fourth and eighth characters to be transferred to the register R1. However, when the shift register 20 transfers the block pulses to the conductor 23, the gate $SG(n+1)$ is not inhibited since the corresponding gate $Cs$ is in state "0." Consequently a pulse is transmitted by the gate $SG(n+1)$ corresponding to the leading edge of the $(n+1)$th block pulse. This pulse is applied to a second input terminal for the shift register 20 and causes it to advance immediately to the next stage. The same pulse from the gate $SG(n+1)$ resets the shift register 24 and the delay in the feed-back circuit via the gate $SG(n+1)1$ is arranged to be such that the "skip" to the sub-matrix $(n+2)$ is completed in substantially less than a clock pulse period. If however it is possible that the large number of sub-matrices may have to be "skipped" in succession, it may be necessary to provide means for inhibiting the clock pulse input to the dividing circuit 21 and the register 24 until a sub-matrix is reached which is not to be skipped.

It will be obvious that the arrangement in FIGURE 5 can be combined in a variety of ways with the arrangements shown in FIGURES 1 to 4.

In all the arrangements so far described, although character or route selection is possible, the time order of the characters remains unaltered. The arrangement illustrated in FIGURE 6 on the other hand allows characters to be re-arranged, that is transferred to a different time order. In this figure, two sub-matrices SML and SMR are shown, that on the left being a complete sub-matrix similar to that shown in FIGURE 2. Moreover, it has a corresponding $Yp$ control circuit whereby on applying read-out pulses in sequence of the X control circuits (only seven of which are shown), only the first, second and fourth characters are read out through the gating circuit 13. The right hand matrix SMR has only three rows of cores K1, K2 and K3 and these are coupled respectively with the X control circuits X3, X5 and X7. The cores of row K1 are however also coupled to the read-out circuit X1 by way of a buffer amplifier 30. Similarly, the cores of the rows K2 and K3 in the circuits X5 and X7 are coupled to the circuits X4 and X2 by buffer amplifiers 31 and 32. The amplifiers 30, 31 and 32 are biassed to render them insensitive to read-in pulses in the circuits X1, X2 and X4 and they are, moreover, arranged to reverse the polarity of read-out pulses and reduce their amplitude to that appropriate to read-in pulses. Therefore, when character one is read out from the sub-matrix SML by way of the gating circuit 13 it is simultaneously read into row K1 of the sub-matrix SMR. Likewise characters two and four are read into rows K3 and K2. Moreover, these characters in rows K1, K2 and K3 are read out by the read-out pulses in the circuit X3, X5 and X7 respectively. Therefore characters one, two and four are read out in the order 3, 7 and 5.

Many modifications of the arrangement shown can be made and in a store comprising a plurality of sub-matrices, one sub-matrix may consist only of programme and skip control cores *Cp* and *Cs*, suitably arranged in rows and columns. In that case by storing suitable binary patterns in this sub-matrix, which may be termed the programme control sub-control, it is possible to direct the characters in the other parts of the store, or in a different store, selectively to a series of destinations and thereby through a plurality of series of individual functions, each series constituting what may be called a micro-programme. This can lead to substantial simplification in programming, since normally each separate function has to be individually programmed.

What I claim is:

1. A storage device suitable for electrical data handling apparatus comprising a matrix of magnetic cores including magnetic cores arranged in rows and columns, column control circuits one for each column of said cores and coupled with each core in the respective column, row control circuits one for each row of said cores and coupled with each core in the respective row, means for successively applying groups of binary code signal elements to said column control circuits, the binary code signal elements of each group being applied individually to the column control circuits, means for applying read in signals to said row control circuits in synchronism with said groups of binary code signal elements, to cause different rows of cores to assume a combination of magnetic states representative of the respective groups of binary code signal elements, means for applying read-out signals individually to said row control circuits to tend to change the cores of the respective rows each to a predetermined magnetic state, a plurality of destinations for binary code signals, and read-out circuit means responsive to changes of the rows of cores to said predetermined magnetic state for selectively applying binary code signals to said destinations, said read-out circuit means including circuits coupled to selected cores of said matrix to cause destination selection to depend on the row control circuit to which read-out signals are applied.

2. A storage device suitable for electrical data handling apparatus comprising a matrix of two state devices including two state devices arranged in rows and columns, a plurality of row control circuits one for each row of said devices and coupled to each device in the respective row, a plurality of column control circuits one for each column of said devices and coupled to each device in the respective column, means for successively applying groups of binary code signal elements to said column control circuits, one signal element of each group to each column control circuit, means for applying read-in signals to said row control circuits in synchronism with said groups of binary code signal elements, to cause said two state devices in different rows to assume a combination of states representing the corresponding groups of binary code signal elements, a plurality of destinations for binary code signal elements, and a plurality of read-out circuits coupling said destinations selectively to said two state devices, and means for applying read-out signals individually to said row control circuits tending to change the two state devices in the respective rows each to a predetermined state, and induce corresponding signals in said read-out circuits, thereby to apply signals selectively to said destinations.

3. A storage device suitable for electrical data handling apparatus comprising a matrix of storage elements for storing data, means for applying electrical data signals to said elements to store representations of said signals, means for applying read-out signals to said elements tending to reproduce data signals from said elements, a plurality of destinations for reproduced signals, means for applying data signals reproduced from some of said storage elements to said destinations, and means responsive to data signals reproduced from others of said storage elements for selectively conditioning said destinations to accept applied signals.

4. A storage device suitable for electrical data handling apparatus comprising a matrix of two state devices including two state devices arranged in rows and columns, a plurality of row control circuits one for each row of said devices and coupled to each device in the respective row, a plurality of column control circuits one for each column of said devices and coupled to each device in the respective column, means for successively applying groups of binary code signal elements to said column control circuits, the signal elements of each group being applied individually to the column control circuit, means for applying read-in signals to said row control circuits in synchronism with said groups of binary code signal elements, to cause said two state devices in different rows to assume a combination of states representing the corresponding groups of binary code signal elements, at least one destination for binary code signal elements, a plurality of read-out circuits one for each of some of the columns of said two state devices and coupling each device in the respective column to said destination, a conditioning circuit for said destination responsive to at least one two state device in another column, means for applying read-out signals successively to said row control circuits tending to change the two state devices in the respective rows each to a predetermined state and induce signals in said read-out circuits and in said conditioning circuit whereby the signals in said read-out circuits are selectively accepted by said destination, in dependence upon a signal in said conditioning circuit.

5. A storage device suitable for electrical data handling apparatus comprising a matrix of two state devices including two state devices arranged in rows and columns, a plurality of row control circuits one for each row of said devices and coupled to each device in the respective row, a plurality of column control circuits one for each column of said devices and coupled to each device in the respective column, means for successively applying groups of binary code signal elements to said column control circuits, one signal element of each group to each column control circuit, means for applying read-in signals to said row control circuits in synchronism with said groups of binary code signal elements, to cause said two state devices in different rows to assume a combination of states representing the corresponding groups of binary code signal elements, a plurality of destinations for said binary code signal elements, a signal counter, a plurality of read-out circuits coupling said destinations to a selection of said two state devices, a plurality of further read-out circuits coupling others of said two state devices to said counting circuit, means responsive to the count registered in said counting circuit selectively to condition said destinations to accept signals in said first read-out circuits, and means for successively applying read-out signals to said row control circuits tending to change the two state devices in the respective rows to a predetermined state and induce corresponding signals in said read-out circuits.

6. A storage device suitable for electrical data handling apparatus comprising a matrix of storage elements for storing data, said storage elements being arranged in groups, means for applying electrical data signals to said elements to store representations of said signals, read-out means for applying read-out signals selectively to the groups of said storage elements, the read-out signals being applied in pre-arranged order to storage elements in the selected group, and means responsive to predetermined signals stored in some storage element in said groups for conditioning said read-out means to omit the application of read-signals to predetermined groups.

7. A storage device suitable for electrical data handling apparatus comprising a matrix of two state devices, means for applying binary signals to said elements in pre-arranged order to change said devices to a combination of states corresponding to applied binary signals, means for applying read-out signals to said devices in pre-arranged order to tend to change said devices each to a predetermined state to reproduce signals corresponding to said applied signals, a group of destinations for reproduced signals, and means selectively coupled to some of said two state devices for applying reproduced signals in re-arranged order to said group of destinations.

8. A storage device according to claim 7, said group of destinations comprising a further matrix of two state devices.

9. In electrical data handling apparatus, a matrix of two state storage devices, comprising a group of data storage devices and a group of programme storage devices, means for storing binary signals in said first group of devices representing data to be manipulated, means for storing binary signals in said second group of devices representing programme control data, means for simultaneously reproducing signals from said groups of storage devices, a plurality of destinations and means for selecting destinations for signals from said group of data storage devices, in response to signals from said group of programme storage devices.

10. A storage device suitable for electrical data handling apparatus comprising a matrix of switchable devices including switchable devices arranged in rows and columns, column control circuits one for each column of said switchable devices and coupled with each device in the respective column, row control circuits one for each row of said device and coupled with each device in the respective row, means for successively applying groups of binary code signal elements to said column control circuits, the binary code signal elements of each group being applied individually to the column control circuits, means for applying read-in signals to said row control circuits in synchronism with said groups of binary code signal elements, to cause different rows of switchable devices to assume a combination of states representative of the respective groups of binary code signal elements, means for applying read-out signals individually to said row control circuits to tend to change the switchable devices of the respective rows each to a predetermined state, a plurality of destinations for binary code signals, and read-out circuit means responsive to changes of the switchable devices in any one row to said predetermined state for selectively applying binary code signals to said destinations, said read-out circuit means including circuits coupled to selected switchable devices of said matrix to cause destination selection to depend on the row control circuit to which read-out signals are applied.

References Cited in the file of this patent

UNITED STATES PATENTS

| | | |
|---|---|---|
| 2,708,267 | Weidenhammer | May 10, 1955 |
| 2,750,580 | Rabenda | June 12, 1956 |
| 2,768,367 | Rajchman | Oct. 23, 1956 |
| 2,785,389 | Warren | Mar. 12, 1957 |
| 2,802,203 | Stuart-Williams | Aug. 6, 1957 |
| 2,856,596 | Miller | Oct. 14, 1958 |

OTHER REFERENCES

EDVAC Progress, June 30, 1946, Report #2, pages 4–22, 4–23, PY–O–164, PY–O–165.